(12) United States Patent
Cromer et al.

(10) Patent No.: US 8,627,003 B2
(45) Date of Patent: Jan. 7, 2014

(54) APPARATUS, SYSTEM, AND METHOD FOR MEMORY UPGRADE PATH OPTIMIZATION

(75) Inventors: Daryl Cromer, Cary, NC (US); Donald R. Frame, Apex, NC (US); Michael Scott Mettler, Durham, NC (US); Kenneth Dean Timmons, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 953 days.

(21) Appl. No.: 12/410,305

(22) Filed: Mar. 24, 2009

(65) Prior Publication Data
US 2010/0250888 A1 Sep. 30, 2010

(51) Int. Cl.
*G06F 12/00* (2006.01)
(52) U.S. Cl.
USPC ............... 711/114; 711/5; 711/104; 711/105; 711/170
(58) Field of Classification Search
None
See application file for complete search history.

(56) References Cited

U.S. PATENT DOCUMENTS

| | | | | |
|---|---|---|---|---|
| 6,092,169 A * | 7/2000 | Murthy et al. | ................ | 711/170 |
| 6,378,039 B1 * | 4/2002 | Obara et al. | .................. | 711/114 |
| 7,013,359 B1 * | 3/2006 | Li | .................. | 710/305 |
| 2006/0206662 A1 * | 9/2006 | Ludwig et al. | ................ | 711/114 |
| 2006/0206675 A1 * | 9/2006 | Sato et al. | ..................... | 711/161 |

* cited by examiner

*Primary Examiner* — Matthew Bradley
*Assistant Examiner* — Alan Otto
(74) *Attorney, Agent, or Firm* — Kunzler Law Group

(57) ABSTRACT

An apparatus, system, and method are disclosed for memory upgrade optimization. A requirements module 402 receives one or more of a capacity upgrade goal 1306 for an overall capacity of the array 706 and a performance upgrade goal 1308 for an overall performance of the array 706. An analysis module 404 identifies a first potential capacity change 1310 that can be achieved at a lower overall performance and a second potential capacity change 1314 that can be achieved at a higher overall performance. A reconfiguration module 406 generates one or more of a first reconfiguration recommendation 1312 calculated to yield an overall capacity improvement that takes into consideration the capacity upgrade goal 1306 and the first potential capacity change 1310 and a second reconfiguration recommendation 1316 calculated to yield an overall performance improvement that takes into consideration the performance upgrade goal 1308 and the second potential capacity change 1314.

25 Claims, 9 Drawing Sheets

---

MEMORY UPGRADE OPTIMIZATION APPARATUS
304

| REQUIREMENTS MODULE 402 | ANALYSIS MODULE 404 | RECONFIGURATION MODULE 406 |

APPARATUS, SYSTEM, AND METHOD FOR MEMORY UPGRADE PATH OPTIMIZATION

BACKGROUND

1. Field

This invention relates to computer system configuration management and more particularly relates to memory configuration.

2. Description of the Related Art

A computer is a complex system, frequently requiring configuration management to optimize operational efficiency. Memory configuration is one important dimension of computer operation, both to expand capacity and to improve performance in a cost-efficient way.

The multiplicity of computer memory device types and characteristics, computer chip sets, and memory array topographies, all combine to present a formidable challenge in terms of memory configuration. A systematic approach to memory upgrade optimization remains an elusive goal.

SUMMARY

From the foregoing discussion, it should be apparent that a long-felt unmet need exists for an apparatus, system, and method that automate memory upgrade optimization in a systematic way. Beneficially, such an apparatus, system, and method would balance speed, capacity, and cost so as to assist in optimizing overall system efficiency.

The present invention has been developed in response to the present state of the art, and in particular, in response to the problems and needs in the art that have hitherto proven intractable under currently available system configuration management. Accordingly, the present invention has been developed to provide an apparatus, system, and method for memory upgrade optimization that overcome many or all of the above-discussed shortcomings in the art.

One approach is to analyze the memory configuration in terms of a single criterion, such as capacity, speed, or cost. A memory that is too slow for system requirements would benefit from faster memory devices. A memory that is too small for system requirements would benefit from more or denser memory devices. A memory that is too expensive for system requirements would benefit from fewer or less costly memory devices.

Another approach to memory upgrade optimization is to balance the potentially competing criteria of capacity, speed, and cost. It may be that increasing overall capacity in terms of memory device count would reduce the speed of the array as a whole, even if the individual memory devices were capable of higher speed. In such a case, depending upon system requirements, one might opt to replace the memory devices with lower-cost, slower memory devices to match the overall speed of the array. Another alternative might be to use fewer, denser memory devices, thereby eliminating the overall speed impact of the excessive memory device count. The decision to replace memory devices might also include a consideration of the cost of the new devices and whether the existing devices could be employed more cost-effectively elsewhere.

While the tradeoffs between competing configuration alternatives will of necessity be based upon the specific system requirements in any given case, an automated mechanism to recommend one or memory reconfiguration upgrade paths, optimized according to various criteria, would be very helpful in determining whether such tradeoffs might need to be explored. The present invention provides such a mechanism, generating reconfiguration recommendations optimized for capacity, for speed, and for overall system efficiency.

The apparatus to optimize memory upgrade paths is provided with a plurality of modules configured to functionally execute the necessary steps of receiving one or more of a capacity upgrade goal for the overall capacity of the array and a performance upgrade goal for the overall performance of the array, identifying a first potential capacity change that can be achieved at a lower overall performance and a second potential capacity change that can be achieved at a higher overall performance, and generating one or more of a first reconfiguration recommendation calculated to yield an overall capacity improvement that takes into consideration the capacity upgrade goal and the first potential capacity change and a second reconfiguration recommendation calculated to yield an overall performance improvement that takes into consideration the performance upgrade goal and the second potential capacity change. These modules in the described embodiments include a requirements module, an analysis module, and a reconfiguration module.

The apparatus, in one embodiment, is configured to determine the overall performance based upon a substantially inverse relationship with a highest quantity of members of a subset of the array and a substantially direct relationship with the individual performance capability of the members. Performance may be determined on the basis of one or more of frequency, bandwidth, access time, and latency. As a useful abstraction to suppress the interrelated complexity of these various performance criteria, a "performance class" may be defined as being representative of those configurations of the array and those individual performance capabilities of the memory devices that would support comparable overall performance.

A system of the present invention is also presented to optimize memory upgrade paths. The system may be embodied by a computer having one or more processors and having a computer memory comprising an array of memory devices, the foregoing apparatus, and a control module that activates the requirements module, the analysis module, and the reconfiguration module to optimize the upgrade path of the array. In particular, the system, in one embodiment, may include other memory devices in the computer memory that are not comprised in the array.

The system may further include subsets of the array which are associated with each of the one or more processors. The individual performance capability of the memory device may be determined on the basis of one or more of rank, capacity, speed, type, and depth. In a further embodiment, the memory device may comprise a dual in-line memory module ("DIMM") and the subset may comprise a channel.

A method of the present invention is also presented for optimizing memory upgrade paths. The method in the disclosed embodiments substantially includes the steps necessary to carry out the functions presented above with respect to the operation of the described apparatus and system, including the steps of receiving the goals, identifying the potential capacity changes, and generating the reconfiguration recommendations. In one embodiment, the reconfiguration recommendations may comprise replacing a member of the array with a member having a different individual performance capability, and may also comprise moving a member from a subset of the array to another subset of the array.

In a further embodiment, the capacity upgrade goal and the performance upgrade goal may be calculated to achieve an overall efficiency of the system, wherein the overall efficiency is at least partially predicted by the overall capacity according to a first function, and by the overall performance according to a second function. The step of generating may further comprise emphasizing the first reconfiguration recommendation if the overall efficiency predicted by the first function is higher, and emphasizing the second reconfiguration recommendation if the overall efficiency predicted by the second function is higher. In an embodiment, the overall efficiency may comprise a system throughput rate, the first function may be based at least in part on a storage subsystem paging rate, and the second function may be based at least in part on a cache subsystem miss penalty.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
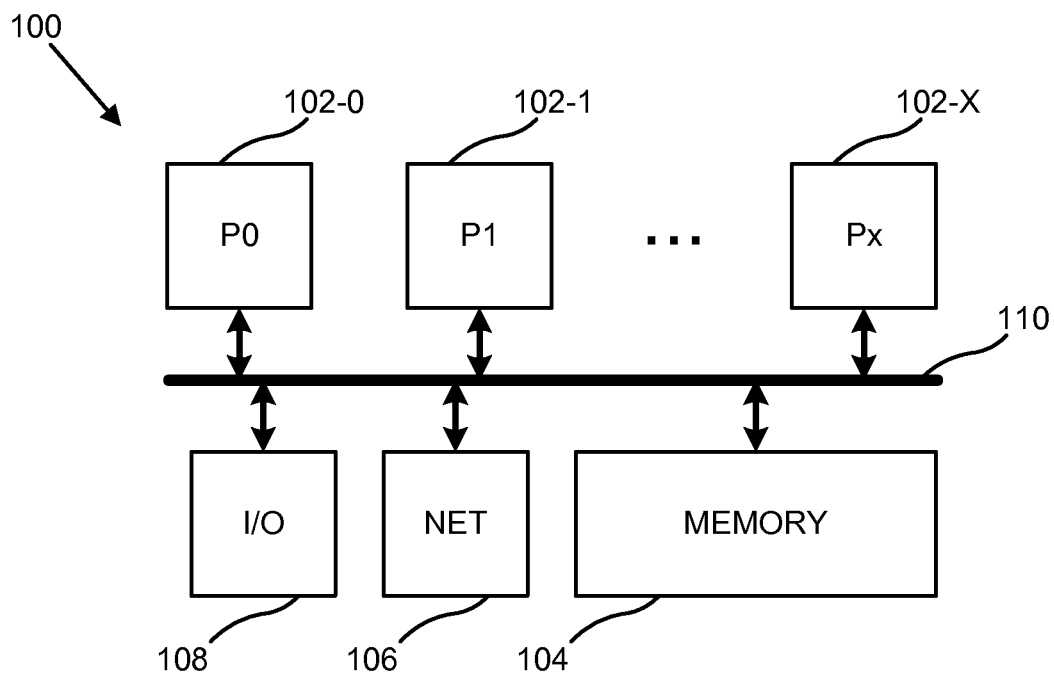
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an I/O (Input/Output) device interface 108, connected through a bus 110.

The hardware platform 100 may be of any form factor or type, including an embedded system, a handheld, a notebook, a personal computer, a minicomputer, a server, a mainframe, a supercomputer, and the like.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, hyperthreaded processors, and the like.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. It may comprise Ethernet, Token Ring, System Network Architecture ("SNA"), and the like. In one embodiment, it may be integrated with the I/O device interface 108.

The I/O device interface 108 may be driven primarily by the processor(s) 102 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
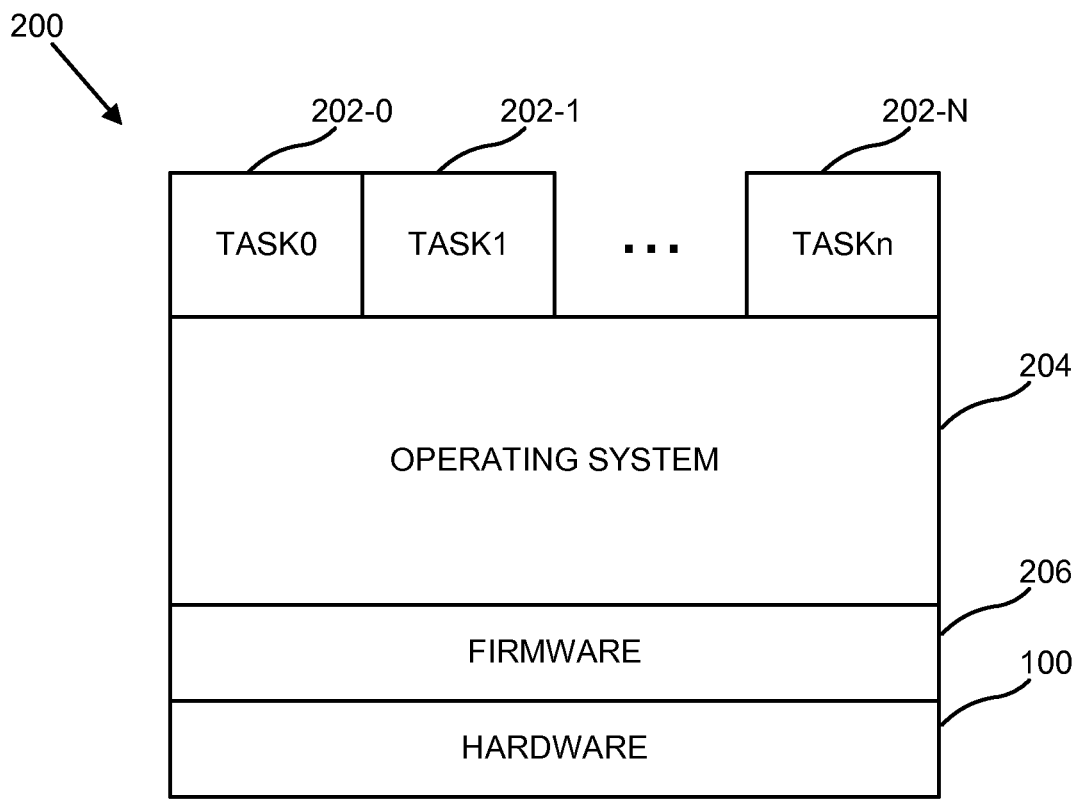
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, middleware, and the like. System-level task(s) 202 may include services, drivers, daemons, utilities, and the like.

The operating system 204 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
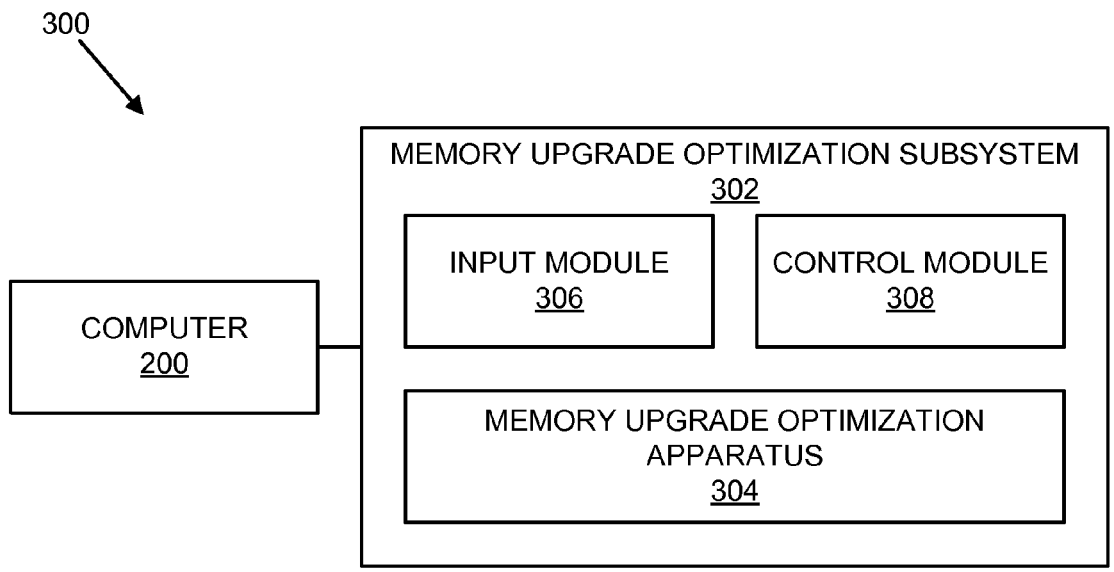
FIG. 3 is a schematic block diagram illustrating a system of the present invention.

FIG. 3 is a schematic block diagram illustrating a system 300 of the present invention, comprising the computer 200 and a memory upgrade optimization subsystem 302. The subsystem 302 further comprises a memory upgrade optimization apparatus 304, an input module 306, and a control module 308. In an embodiment, the foregoing components of the subsystem 302 may be fully or partially implemented within the hardware platform 100 or the software stack of the computer 200. The input module 306 may receive and convey to one or more other modules input such as configuration information regarding an array of memory devices comprised within the memory 104 of the hardware platform 100. The configuration information may be automatically detected, such as at initial power-on during power-on system test ("POST"), manually specified, or may comprise both automatic and manual forms of input. The apparatus 304 may be employed whenever memory upgrade optimization is required in order to effect a given operation of the system 300, activated by the control module 308. Operations requiring a memory upgrade optimization may include reconfiguration of the memory 104, a change or upgrade of other related components within the hardware platform 100 such as the bus 110, system performance tuning, and the like.

Figure 4:
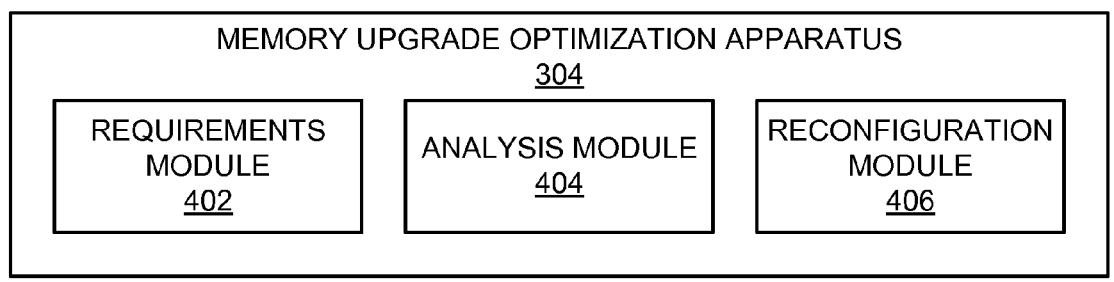
FIG. 4 is a schematic block diagram illustrating a memory upgrade optimization apparatus according to the present invention.

FIG. 4 is a schematic block diagram illustrating the memory upgrade optimization apparatus 304 according to the present invention, comprising a requirements module 402, an analysis module 404, and a reconfiguration module 406. The requirements module 402 may receive a capacity upgrade goal, a performance upgrade goal, or both. The requirements module 402 may also determine an overall capacity of the array and an overall performance of the array based upon the configuration information from the input module 306. An upgrade typically denotes an increase in capacity or performance, but may also denote a decrease, particularly if there is an inverse relationship between capacity and performance.

The analysis module 404 identifies a first potential capacity change that can be achieved at a lower overall performance and a second potential capacity change that can be achieved at a higher overall performance. In this context, the terms lower and higher should be understood to be relative to one another. The overall capacity and the overall performance may potentially change in either an upward or downward direction. The potential capacity changes may therefore be either positive or negative. In one embodiment, a lower overall performance may permit a higher overall capacity, whereas a higher overall performance may only permit a lower overall capacity. As a result, the first potential capacity change may be greater than the second potential capacity change.

The reconfiguration module 406 may generate one or more reconfiguration recommendations. A first reconfiguration recommendation may be calculated to yield an overall capacity improvement that takes into consideration the capacity upgrade goal and the first potential capacity change. For example, the current overall performance of the array may correspond to the lower overall performance, and it may be desired to increase the capacity of the array without reducing the current overall performance. The analysis module 404 would therefore identify a first potential capacity change that would not impact the current overall performance.

In one embodiment, the reconfiguration module 406 may recommend a capacity improvement equal to the capacity upgrade goal if the capacity upgrade goal is less than or equal to the first potential capacity change. In another embodiment, the reconfiguration module 406 may recommend a capacity improvement equal to the first potential capacity change if the capacity upgrade goal is greater than the first potential capacity change. In a further embodiment, the reconfiguration module 406 may generate one or more reconfiguration recommendations greater than the first potential capacity change and less than the capacity upgrade goal.

A second reconfiguration recommendation may be calculated to yield an overall performance improvement that takes into consideration the performance upgrade goal and the second potential capacity change. For example, the performance upgrade goal may correspond to the higher overall performance. The analysis module 404 therefore would identify a second potential capacity change that would permit the performance upgrade goal to be achieved.

In one embodiment, the reconfiguration module 406 may recommend a capacity improvement equal to the capacity upgrade goal if the capacity upgrade goal is less than or equal to the second potential capacity change. In another embodiment, the reconfiguration module 406 may recommend a capacity improvement equal to the second potential capacity change if the capacity upgrade goal is greater than the second potential capacity change. In a further embodiment, the reconfiguration module 406 may generate one or more reconfiguration recommendations greater than the second potential capacity change and less than the capacity upgrade goal.

Figure 5:
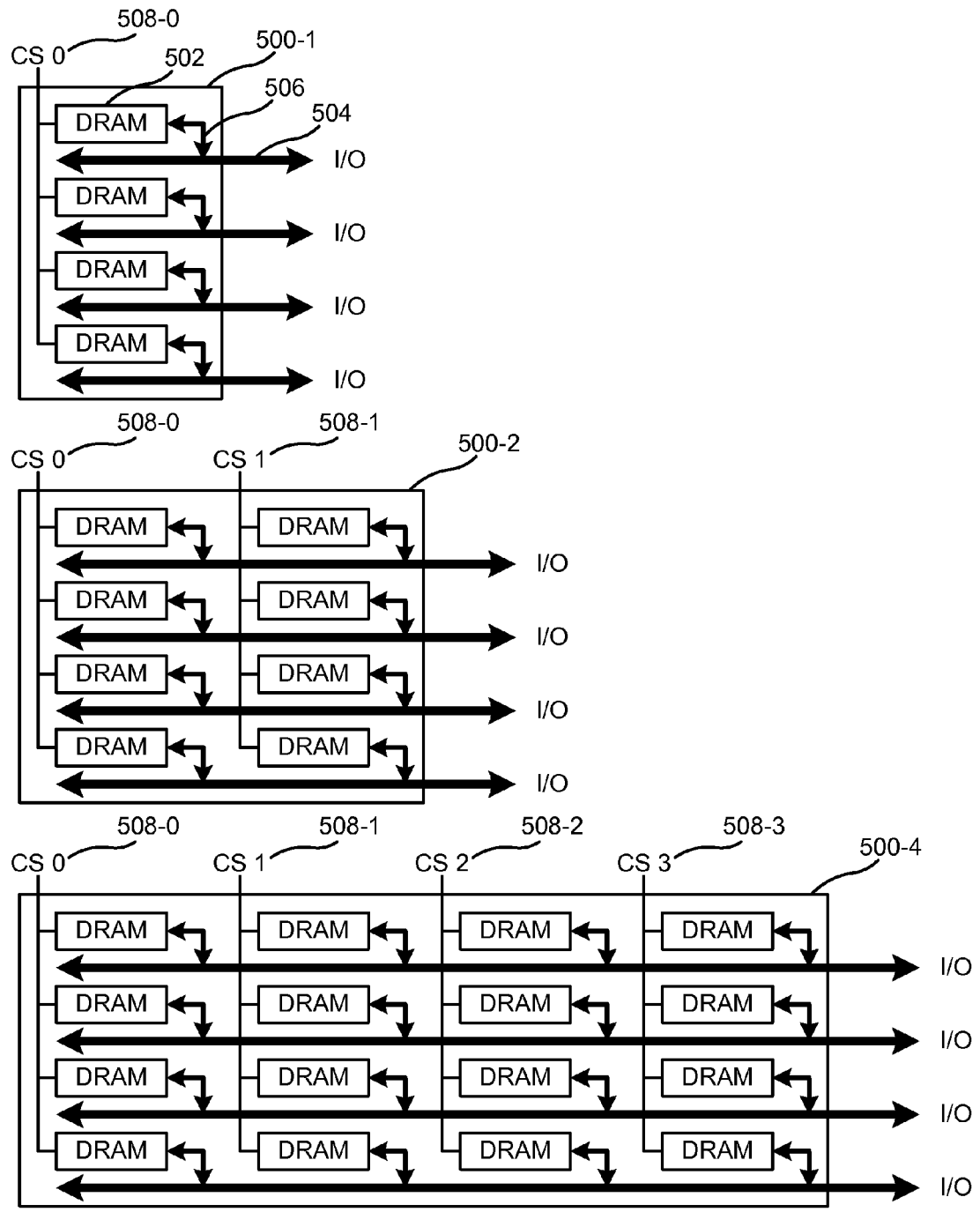
FIG. 5 is a schematic block diagram of memory device organization and structure.

FIG. 5 is a schematic block diagram of memory device organization and structure, including a single-rank memory device 500-1, a double-rank memory device 500-2, and a quad-rank memory device 500-4. The memory device 500 is comprised of one or more ranks of dynamic random-access memory chips ("DRAMs") 502. The DRAM 502 is connected to a bi-directional bus 504 via a tri-state connection 506. The tri-state connection 506 is enabled to drive the bi-directional bus 504 when a chip select 508 is asserted. A rank comprises all of the DRAMs controlled by a given chip select 508. First chip selects 508-0 control the first rank of their respective memory devices 500. Second chip selects 508-1 control the second rank of the double-rank memory device 500-2 and the quad-rank memory device 500-4. Third and fourth chip selects 508-2 and 508-3 control the third and fourth ranks respectively of the quad-rank memory device 500-4. In the embodiment shown, each rank comprises four DRAMs connected respectively to each of four bi-directional busses 504 in each memory device 500. Other embodiments may comprise a greater or lesser number of DRAMs 502 per rank.

Figure 6:
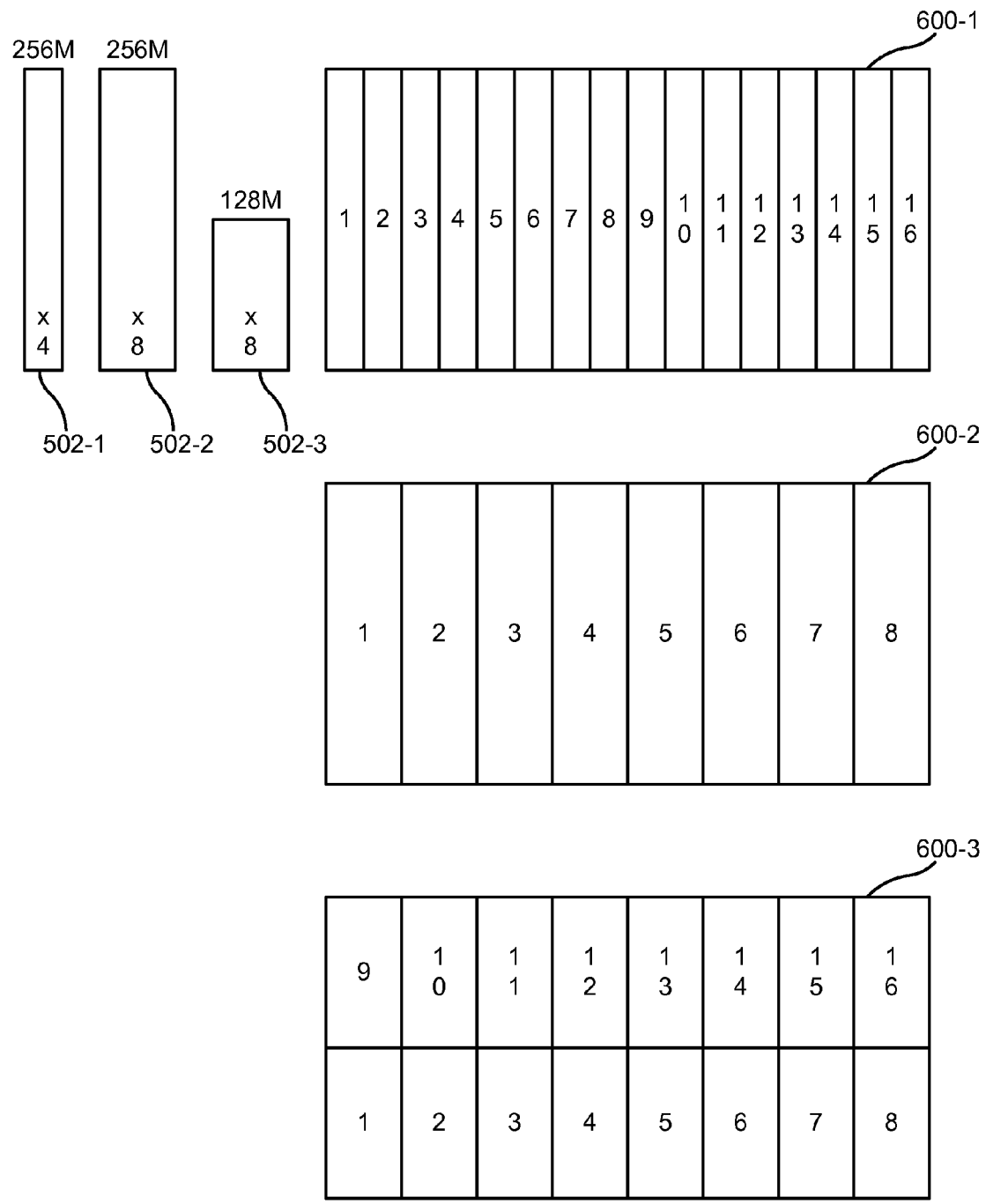
FIG. 6 is a schematic block diagram of dual in-line memory module ("DIMM") organization and structure.

FIG. 6 is a schematic block diagram of dual in-line memory module ("DIMM") 600 organization and structure. DIMMs 600-1 and 600-2 are single-rank memory devices 500-1, and DIMM 600-3 is a double-rank memory device 500-2. All of the DIMMs 600 shown have a capacity of 2 gigabytes (GB) with a total depth of $256 \times 2^{20}$ (M) and a total bus width of 64 bits. DIMM 600-1 is comprised of 16 DRAMs 502-1, each of which is 256 M deep and 4 bits wide. DIMM 600-2 is comprised of 8 DRAMs 502-2, each of which is 256 M deep and 8 bits wide. DIMM 600-3 is comprised of 16 DRAMs 502-3, each of which is 128 M deep and 8 bits wide. Other embodiments differing by rank, depth, width, and capacity are also possible.

DIMMs 600 may also vary as to speed in megahertz (MHz) and type. The DIMMs 600 as shown are unbuffered (type U). DIMMs 600 may also be fully buffered (type FB), registered (type R), and so forth. Some or all of the foregoing characteristics may affect the individual performance capability of a DIMM 600. For example, a first DIMM 600 having a speed of 1066 MHz and a width of 64 bits would have higher bandwidth than a second DIMM 600 having a speed of 1333 MHz and a width of 32 bits, even though the speed of the first is lower than that of the second. As another example, higher rank may also affect individual performance capability, possibly due to increased loading on the bi-directional bus 504 from the higher number of tri-state connections 506. Thus a quad-rank memory device 500-4 may only support a speed of 800 MHz even though its constituent DRAMs 502 might have otherwise supported a higher speed in a lower-rank configuration.

Figure 7:
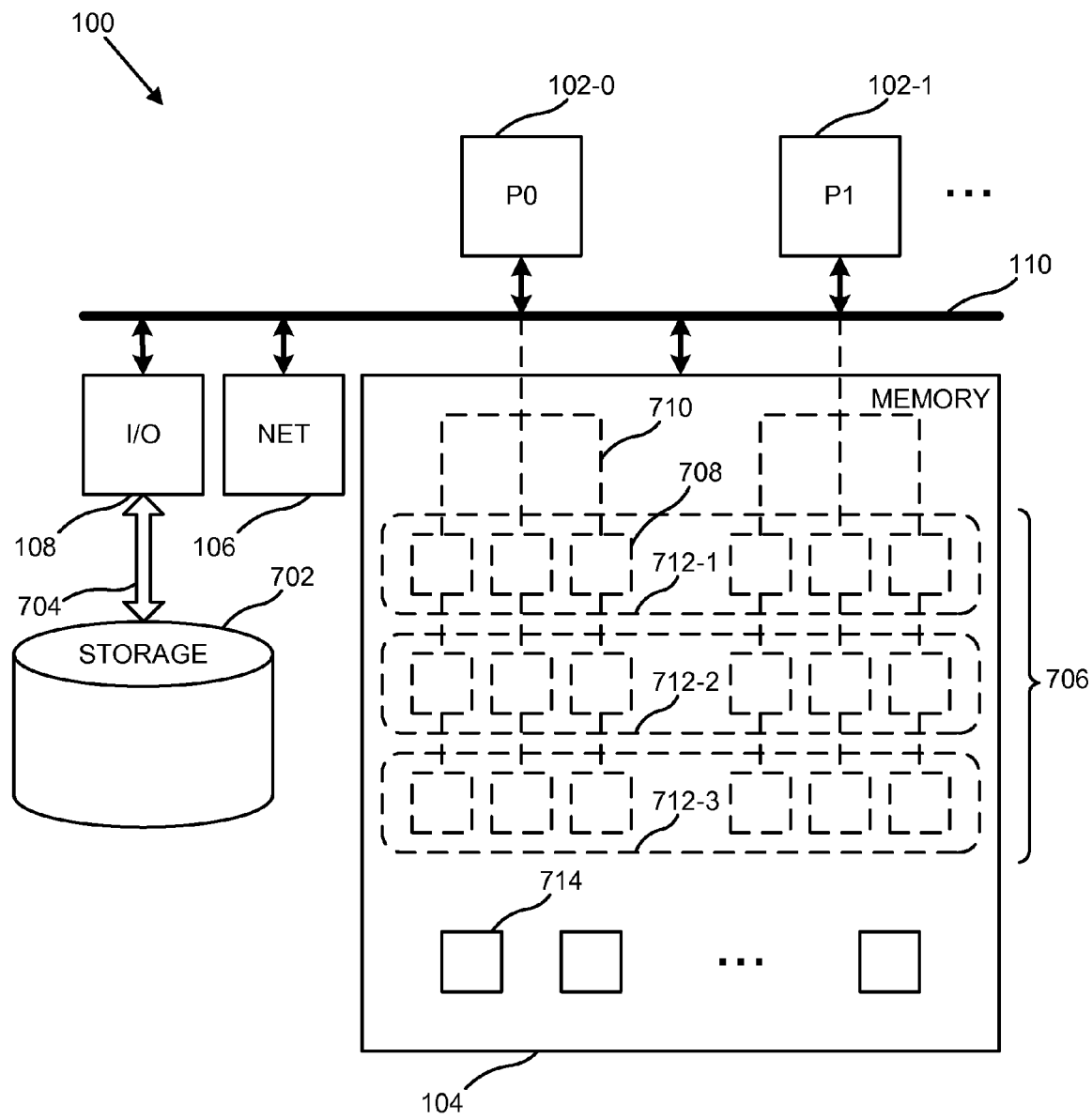
FIG. 7 is a more detailed schematic block diagram of the computer hardware platform.

FIG. 7 is a more detailed schematic block diagram of the computer hardware platform 100, further comprising a storage subsystem 702 connected via a storage interface 704 to the input/output device interface 108. The memory 104 comprises an array 706 of slots 708 to accommodate the memory devices 500. The slots 708 may be organized into subsets in which the slots 708 share the same channel 710. In the example shown, there are three channels 710 associated with each processor 102. The slots 708 are also grouped in tiers 712. In populating the slots 708 of a given channel 710 with memory devices 500, the slot 708 of the first tier 712-1 must be populated first, followed by the second tier 712-2, and then the third tier 712-3. There may also be other memory devices 714 which are not part of the array 706. Examples of other such memory devices include read-only memory ("ROM"), flash memory, complementary metal-oxide-semiconductor memory ("CMOS"), and the like.

In an embodiment, as the quantity of memory devices 500 populating the slots 708 of a given channel 710 increases, the overall performance of the array 706 may decrease, due to an increased load on the channel 710 or other design issues. The overall performance may also be limited by the individual performance capability of the lowest-performing device 500 in the array 706. As a result, the overall performance may have a substantially inverse relationship with the highest quantity of memory devices 500 populating a channel 710 of the array 706 and a substantially direct relationship with the lowest individual performance capability of the memory devices 500 themselves. These competing factors create a trade-off between the overall performance and the overall capacity of the array 706.

Performance, whether the overall performance of the array 706, or the individual performance capability of the memory device 500, may comprise one or more criteria such as frequency, bandwidth, access time, latency, and the like. In one embodiment, a single metric such as frequency expressed in MHz may suffice to characterize performance, everything else being equal. However, in another embodiment, the bandwidth might also vary if a configuration change in the array 706 involves a corresponding change in the width of the bus 110. In yet another embodiment, the latency may increase due to memory devices 500 populating increasingly remote slots 708 of the array 706, while the frequency may be kept constant by employing a pipelining approach.

As a useful abstraction to suppress the interrelated complexity of these various performance criteria, we shall hereinafter refer to a "performance class" as being representative of those processors 102, those configurations of the array 706 and those individual performance capabilities of the memory devices 500 that would support comparable overall performance. For example, performance class one may comprise processors 102 and memory devices 500 having a speed of 1333 MHz or an array 706 having only the first tier 712-1 populated, performance class two may comprise processors 102 and memory devices 500 having a speed of 1066 MHz or an array 706 having both the first tier 712-1 and the second tier 712-2 populated, and performance class three may comprise processors 102 and memory devices 500 having a speed of 800 MHz or an array 706 having all three tiers 712 are populated. It will be apparent to one of skill in the art that classification into performance classes could be based upon other performance criteria as well, which other criteria therefore fall within the scope of the present invention.

Figure 8:
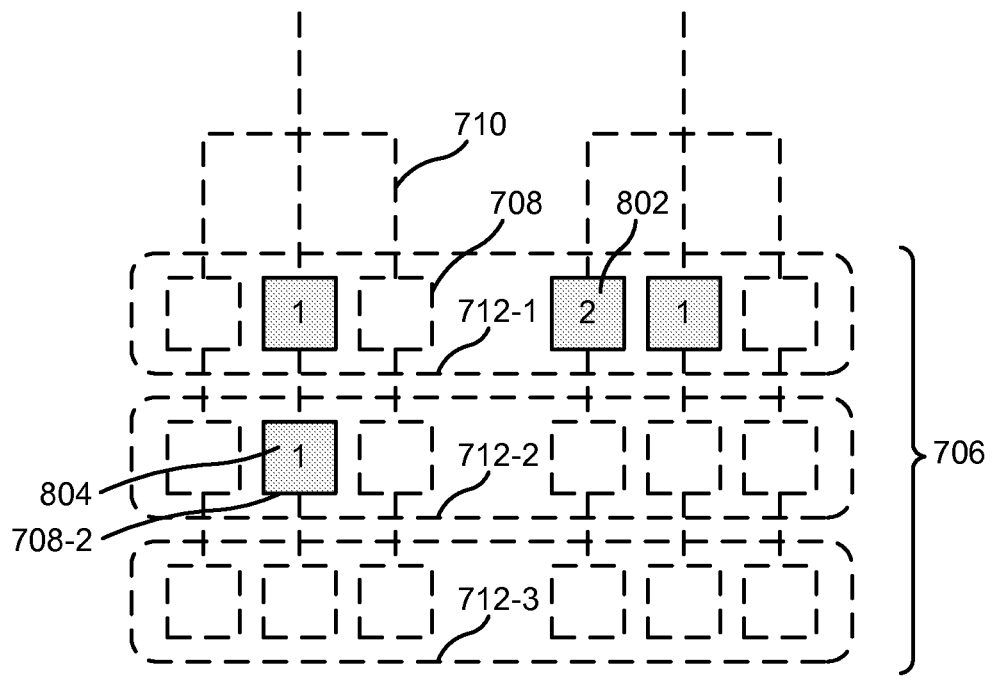
FIG. 8 is a schematic block diagram illustrating an example of a suboptimally configured memory array.

FIG. 8 is a schematic block diagram illustrating an example of a suboptimally configured memory array 706. The overall performance of the array 706 is of performance class is two, because the inherent performance capability of memory device 802 is of performance class two, and the second tier 712-2 is populated by a memory device 804.

Figure 9:
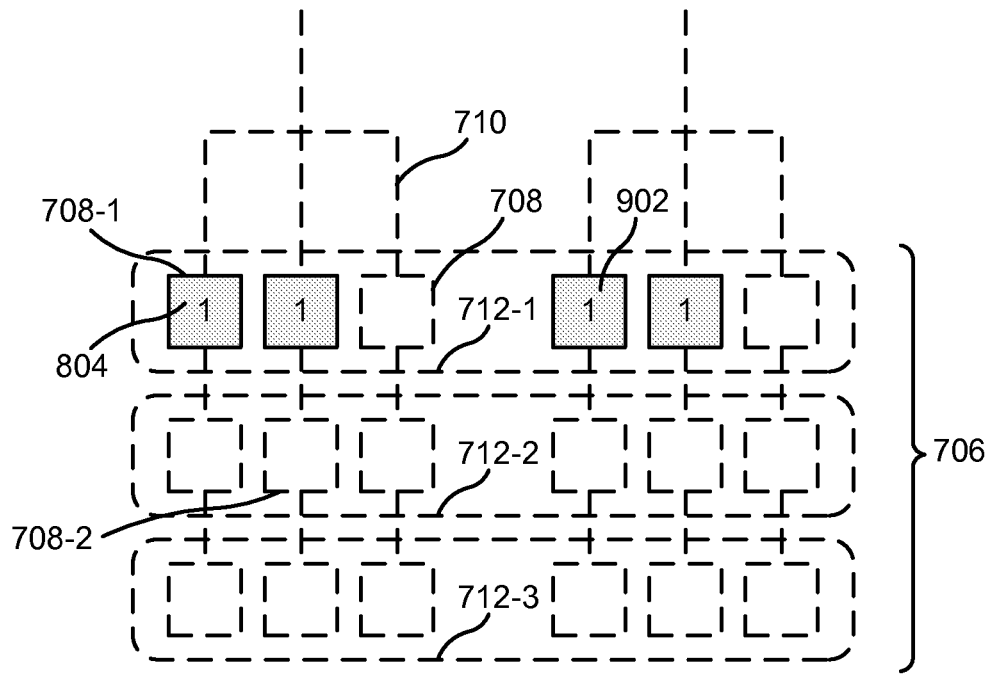
FIG. 9 is a schematic block diagram of an upgraded reconfiguration of the memory array calculated to yield an overall performance improvement.

FIG. 9 is a schematic block diagram of an upgraded reconfiguration of the memory array 706 calculated to yield an overall performance improvement to performance class one. First, the memory device 802 of performance class two has been replaced with a memory device 902 of performance class one. Secondly, the memory device 804 has been moved from slot 708-2 of the second tier 712-2 to slot 708-1 of the first tier 712-1. As a result, the overall performance of the array 706 is now of performance class one.

Figure 10:
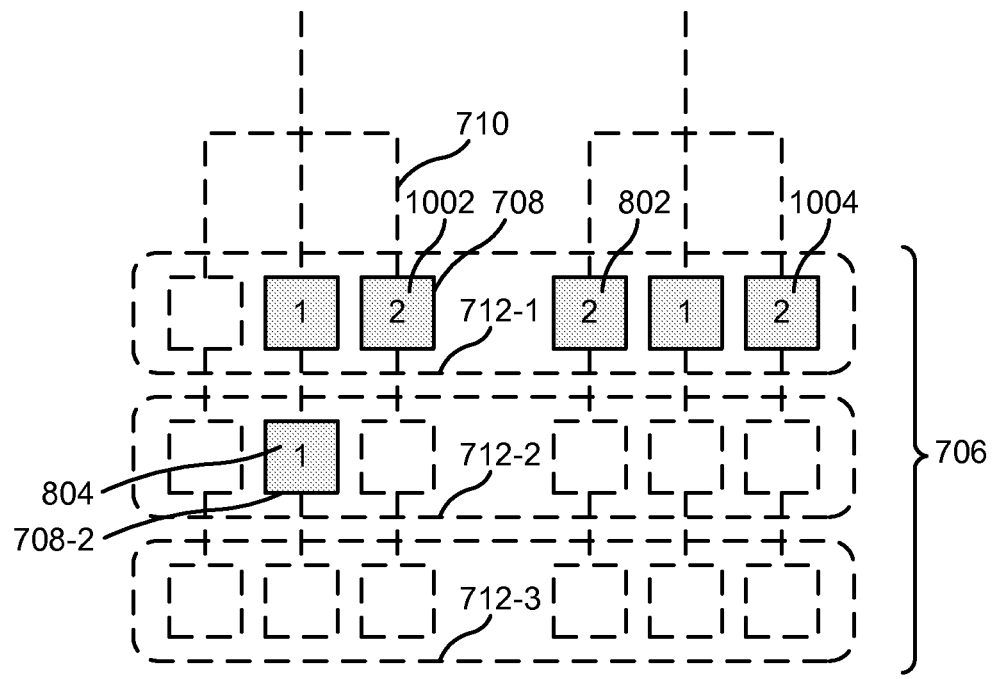
FIG. 10 is a schematic block diagram of an upgraded reconfiguration of the memory array calculated to yield an overall capacity improvement.

FIG. 10 is a schematic block diagram of an upgraded reconfiguration of the memory array 706 calculated to yield an overall capacity improvement to an overall capacity of 6 memory devices. The capacity upgrade goal is therefore 2 additional memory devices, and there is no performance upgrade goal. Given that the current overall performance is of performance class two, the first potential capacity change would be 8 memory devices, as identified by the 12 slots 708 to fully populate the first tier 712-1 and the second tier 712-2 minus the 4 memory devices 500 that are already present. Thus there is ample potential capacity to add memory device 1002 and memory device 1004, which are both of performance class two, the same as the current overall performance.

Figure 11:
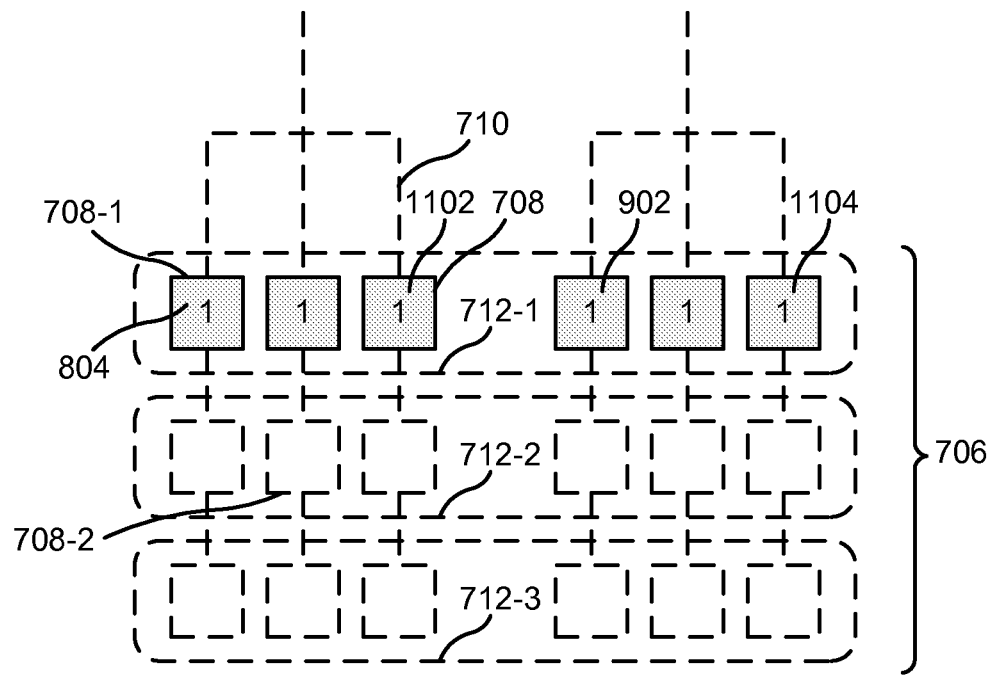
FIG. 11 is a schematic block diagram of an upgraded reconfiguration of the memory array calculated to yield both an overall performance improvement and an overall capacity improvement.

FIG. 11 is a schematic block diagram of an upgraded reconfiguration of the memory array 706 calculated to yield both an overall performance improvement to performance class one and an overall capacity improvement to an overall capacity of 6 memory devices. The capacity upgrade goal is therefore 2 additional memory devices, and the performance upgrade goal is one class higher. Given that the overall performance improvement is to performance class one, the second potential capacity change would be 2 memory devices, as identified by the 6 slots 708 to fully populate the first tier 712-1 minus the 4 memory devices 500 that are already present. Thus there is sufficient potential capacity to add memory device 1102 and memory device 1104, which are both of performance class one, as required to achieve the overall performance improvement. It is further necessary to replace memory device 802 of performance class two with memory device 902 of performance class one, and move memory device 804 from slot 708-2 of the second tier 712-2 to slot 708-1 of the first tier 712-1. As a result, the overall performance of the array 706 is now of performance class one.

Figure 12:
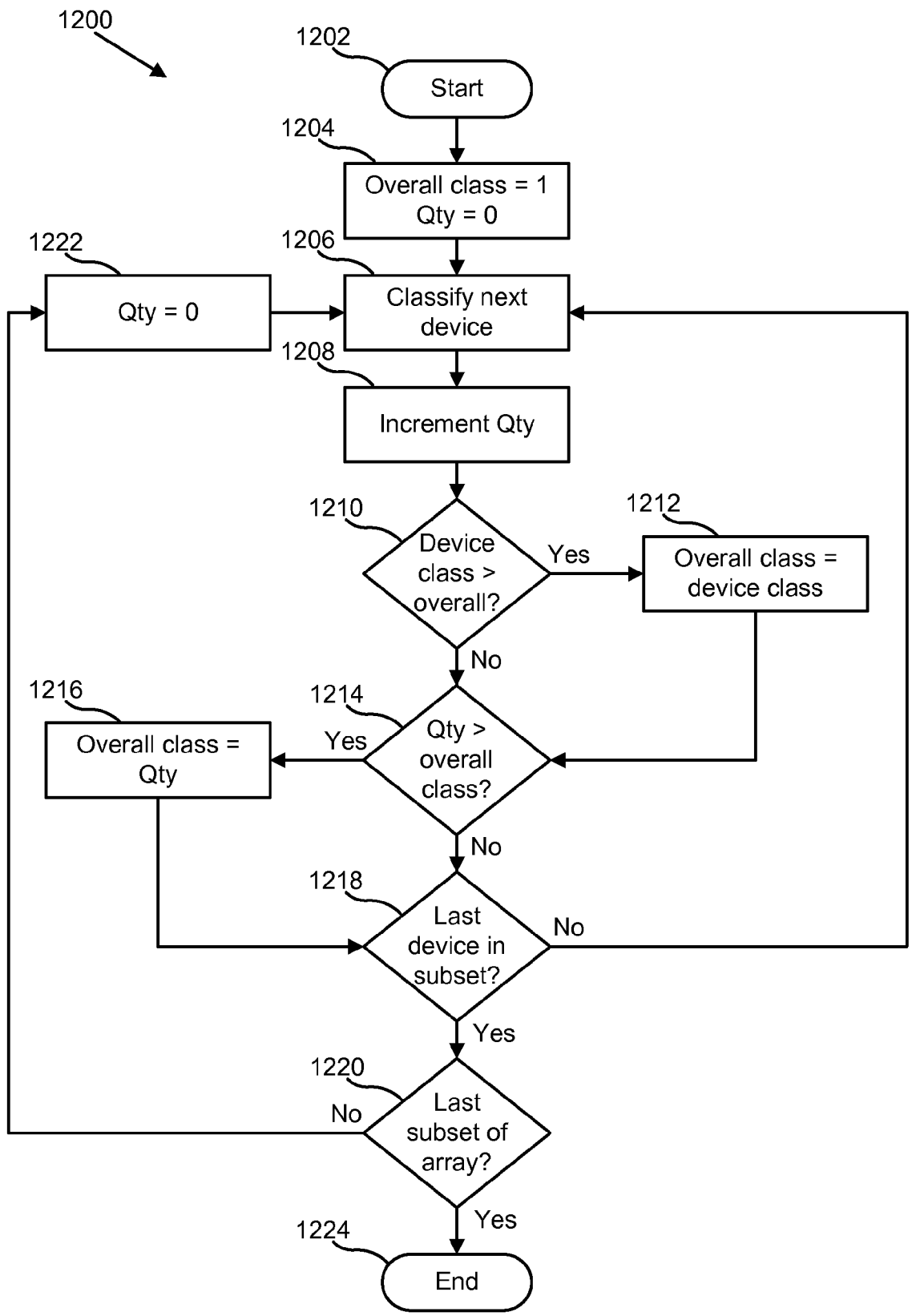
FIG. 12 is a schematic flow chart diagram illustrating one embodiment of a method for determining overall performance of a memory array as may be performed by a requirements module in accordance with the present invention.

FIG. 12 is a schematic flow chart diagram illustrating one embodiment of a method for determining overall performance of a memory array 706 as may be performed by a requirements module 402 in accordance with the present invention. The method 1200 starts 1202 and the overall performance class of the array 706 and the quantity of memory devices 500 populating a subset or channel 710 are initialized 1204 to one and zero, respectively. The memory devices 500 are then examined in turn, classifying 1206 the individual performance capability of the next memory device, and the quantity is incremented 1208. If the memory device performance class representing the individual performance capability of the memory device 500 is greater than 1210 the overall performance class, then the overall performance class is set equal 1212 to the memory device performance class. If the quantity is greater than 1214 the overall performance class, then the overall performance class is set equal 1216 to the quantity. If the memory device 500 is not the last 1218 device in the subset, then the next memory device 500 is classified 1206 and the ensuing steps are repeated. If the subset is not the last 1220 subset in the array 706, then the next subset is examined in turn, reinitializing 1222 the quantity to zero, classifying 1206 the next memory device 500, and repeating the ensuing steps as before. After the last 1220 subset has been examined, the overall performance class has now been determined as the maximum of the memory device performance class of any individual memory device 500 and the quantity of memory devices 500 in any subset, and the method 1200 ends 1224.

Figure 13:
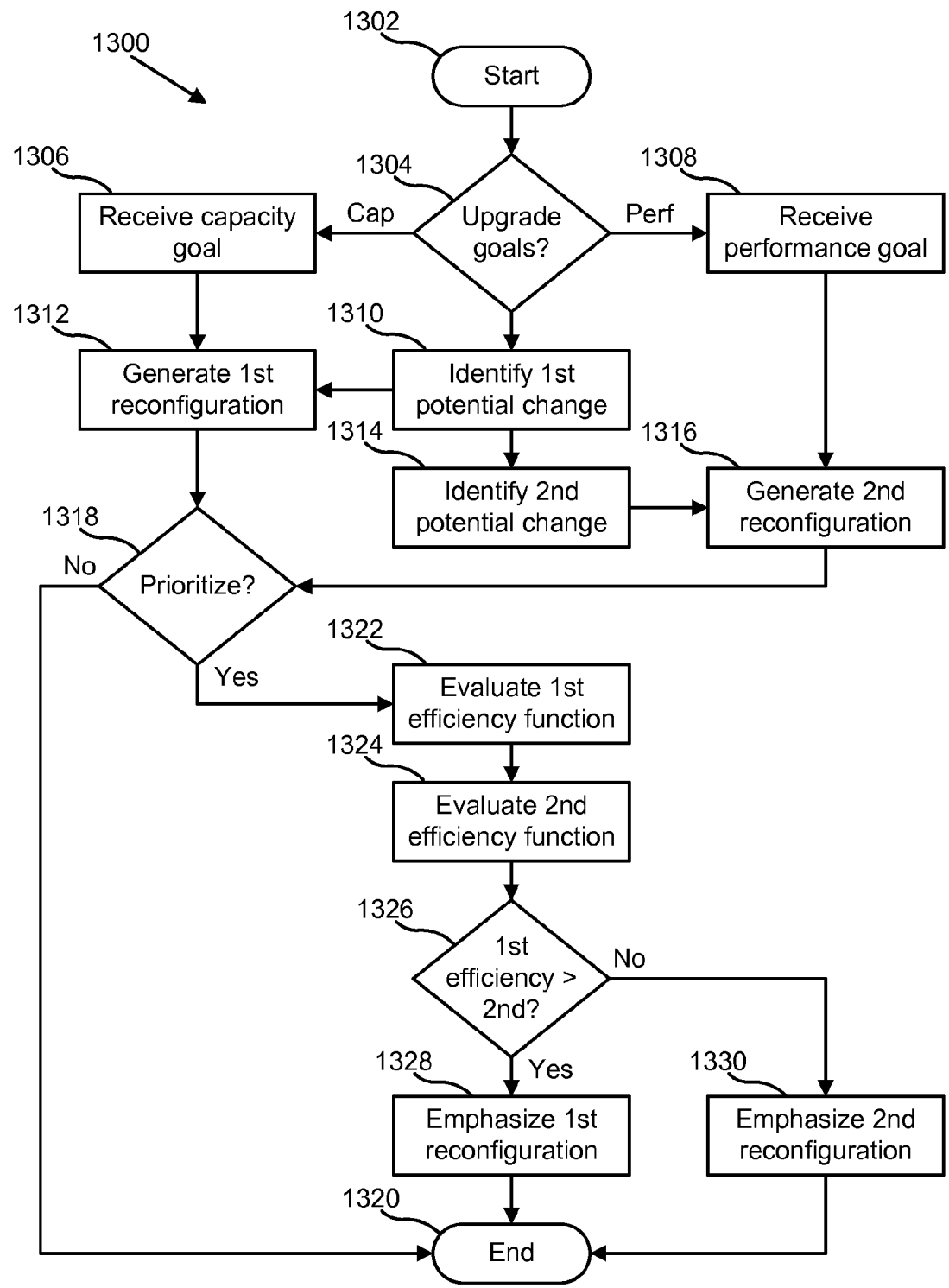
FIG. 13 is a schematic flow chart diagram illustrating one embodiment of a method for memory upgrade optimization as may be performed by the memory upgrade optimization apparatus in accordance with the present invention.

FIG. 13 is a schematic flow chart diagram illustrating one embodiment of a method for memory upgrade optimization as may be performed by the memory upgrade optimization apparatus 304 in accordance with the present invention. The method 1300 starts 1302 and examines 1304 the upgrade goals. If there is a capacity upgrade goal then it is received 1306 and if there is a performance upgrade goal then it is received 1308. The first potential capacity change is identified 1310 and the first reconfiguration recommendation is generated 1312 if the capacity upgrade goal was received 1306. The second potential capacity change is identified 1314 and the second reconfiguration recommendation is generated 1316 if the performance upgrade goal was received 1308. If the reconfiguration recommendations are not to be prioritized 1318, including the case of there being only one reconfiguration recommendation, then the method 1300 ends 1320.

If the reconfiguration recommendations are to be prioritized 1318, then a first function of the overall capacity that at least partially predicts an overall efficiency of the system 300 is evaluated 1322, and a second function of the overall performance that at least partially predicts the overall efficiency is evaluated 1324. If the overall efficiency predicted by the first function is higher 1326 than that predicted by the second function, then the first reconfiguration recommendation is emphasized 1328, and the method 1300 ends 1320. Otherwise, the second reconfiguration recommendation is emphasized 1330, and the method 1300 ends 1320.

In one embodiment, the overall efficiency is evaluated in terms of system throughput, the first function is based at least in part on a paging rate of the storage subsystem 702, and the second function is based at least in part on a cache subsystem miss penalty. For example, the first function may comprise a first factor times the overall capacity. As overall capacity increases, the paging rate decreases, increasing the overall efficiency by the first factor. Similarly, the second function may comprise a second factor times the overall performance. As overall performance increases, the cache subsystem miss penalty decreases, increasing the overall efficiency by the second factor.

If the first function predicts lower overall efficiency, the system 300 is said to be I/O-bound, meaning that the time spent retrieving pages from the storage subsystem 702 is the dominant constraint on the system throughput rate. Increasing the capacity of the memory array 706 allows more pages to remain resident, thereby reducing the paging rate and improving the overall efficiency.

If the second function predicts lower overall efficiency, the system 300 is said to be CPU-bound, meaning that the time spent retrieving data from the memory array 706 into the cache subsystem of the processors 102 is the dominant constraint on the system throughput rate. Increasing the performance of the memory array 706 allows the data to be retrieved more quickly from the memory array 706, thereby reducing the cache subsystem miss penalty and improving the overall efficiency.

As a result, an I/O-bound system 300 may achieve higher throughput by emphasizing the first reconfiguration recommendation calculated to yield an overall capacity improvement, whereas a CPU-bound system 300 may achieve higher throughput by emphasizing the second reconfiguration recommendation calculated to yield an overall performance improvement.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a requirements module that receives one or more of a capacity upgrade goal for an overall capacity of an array of members that are memory devices in a computer memory and a speed-related performance upgrade goal for an overall performance of the array, each member of the array having an individual performance capability wherein the overall performance has a substantially inverse relationship with a highest quantity of members of a subset of the array and a substantially direct relationship with the individual performance capability of the members;
   an analysis module that identifies a first potential capacity change that can be achieved at a lower overall performance and a second potential capacity change that can be achieved at a higher overall performance; and
   a reconfiguration module that generates one or more of a first physical reconfiguration recommendation calculated to yield an overall capacity improvement that takes into consideration the capacity upgrade goal and the first potential capacity change and a second physical reconfiguration recommendation calculated to yield an overall performance improvement that takes into consideration the performance upgrade goal and the second potential capacity change,
   wherein the requirements module, the analysis module, and the reconfiguration module comprise one or more of logic hardware and executable code, the executable code stored on one or more non-transitory computer-readable storage media.

2. The apparatus of claim 1, wherein the overall performance and the individual performance capabilities each belong to one of a plurality of performance classes defined as being representative of those configurations of the array and those individual performance capabilities of the memory devices that would support comparable overall performance.

3. The apparatus of claim 1, wherein performance is determined on the basis of one or more of clock frequency in hertz, bandwidth, access time, and latency.

4. The apparatus of claim 2, wherein the performance classes are based solely upon clock frequency in hertz.

5. A system comprising:
   a computer having one or more processors and having a computer memory comprising an array of members that are memory devices;
   a requirements module that receives one or more of a capacity upgrade goal for an overall capacity of an array of memory devices in a computer memory and a speed-related performance upgrade goal for an overall performance of the array, each member of the array having an individual performance capability wherein the overall performance has a substantially inverse relationship with a highest quantity of members of a subset of the array and a substantially direct relationship with the individual performance capability of the members;
   an analysis module that identifies a first potential capacity change that can be achieved at a lower overall performance and a second potential capacity change that can be achieved at a higher overall performance;
   a reconfiguration module that generates one or more of a first physical reconfiguration recommendation calculated to yield an overall capacity improvement that takes into consideration the capacity upgrade goal and the first potential capacity change and a second physical reconfiguration recommendation calculated to yield an overall performance improvement that takes into consideration the performance upgrade goal and the second potential capacity change; and
   a control module that activates the requirements module, the analysis module, and the reconfiguration module to optimize an upgrade path of the array,
   wherein the requirements module, the analysis module, the reconfiguration module, and the control module comprise one or more of logic hardware and executable code, the executable code executable on the processor and stored in one or more of the array of memory devices and another memory device in the computer memory.

6. The system of claim 5, wherein the overall performance and the individual performance capabilities each belong to one of a plurality of performance classes defined as being representative of those configurations of the array and those individual performance capabilities of the memory devices that would support comparable overall performance.

7. The system of claim 5, wherein one or more of the subsets of the array are associated with each of the one or more processors.

8. The system of claim 5, wherein the capacity upgrade goal and the performance upgrade goal are calculated to achieve an overall efficiency of the system, wherein the overall efficiency comprises a system throughput rate that is at least partially predicted by the overall capacity according to a first function based at least in part on a storage subsystem paging rate, and by the overall performance according to a second function based at least in part on a cache subsystem miss penalty.

9. The system of claim 5, wherein the individual performance capability of the memory device is determined on the basis of one or more of rank, capacity, speed, type, and depth.

10. The system of claim 5, wherein the memory device comprises a dual in-line memory module ("DIMM") and the subset comprises a channel.

11. The system of claim 6, wherein the overall performance and the individual performance capability of at least one member belong to different performance classes.

12. A computer program product comprising a non-transitory computer-readable storage medium having computer usable program code executable to perform operations, the operations of the computer program product comprising:
  receiving one or more of a capacity upgrade goal for an overall capacity of an array of members that are memory devices in a computer memory and a speed-related performance upgrade goal for an overall performance of the array, each member of the array having an individual performance capability wherein the overall performance has a substantially inverse relationship with a highest quantity of members of a subset of the array and a substantially direct relationship with the individual performance capability of the members;
  identifying a first potential capacity change that can be achieved at a lower overall performance and a second potential capacity change that can be achieved at a higher overall performance; and
  generating one or more of a first physical reconfiguration recommendation calculated to yield an overall capacity improvement that takes into consideration the capacity upgrade goal and the first potential capacity change and a second physical reconfiguration recommendation calculated to yield an overall performance improvement that takes into consideration the performance upgrade goal and the second potential capacity change.

13. The computer program product of claim 12, wherein the overall performance and the individual performance capabilities each belong to one of a plurality of performance classes defined as being representative of those configurations of the array and those individual performance capabilities of the memory devices that would support comparable overall performance.

14. The computer program product of claim 12, wherein the capacity upgrade goal and the performance upgrade goal are calculated to achieve an overall efficiency of a system, wherein the overall efficiency is at least partially predicted by the overall capacity according to a first function, and by the overall performance according to a second function.

15. The computer program product of claim 14, wherein the step of generating further comprises emphasizing the first physical reconfiguration recommendation if the overall efficiency predicted by the first function is higher, and emphasizing the second physical reconfiguration recommendation if the overall efficiency predicted by the second function is higher.

16. The computer program product of claim 13, wherein the performance classes are based solely upon clock frequency in hertz.

17. A machine-implemented method comprising the steps of:
  receiving one or more of a capacity upgrade goal for an overall capacity of an array of members that are memory devices in a computer memory and a speed-related performance upgrade goal for an overall performance of the array, each member of the array having an individual performance capability wherein the overall performance has a substantially inverse relationship with a highest quantity of members of a subset of the array and a substantially direct relationship with the individual performance capability of the members;
  identifying a first potential capacity change that can be achieved at a lower overall performance and a second potential capacity change that can be achieved at a higher overall performance; and
  generating one or more of a first physical reconfiguration recommendation calculated to yield an overall capacity improvement that takes into consideration the capacity upgrade goal and the first potential capacity change and a second physical reconfiguration recommendation calculated to yield an overall performance improvement that takes into consideration the performance upgrade goal and the second potential capacity change.

18. The method of claim 17, wherein the overall performance and the individual performance capabilities each belong to one of a plurality of performance classes defined as being representative of those configurations of the array and those individual performance capabilities of the memory devices that would support comparable overall performance.

19. The method of claim 18, wherein the physical reconfiguration comprises replacing a member of the array with a member having a different individual performance capability.

20. The method of claim 18, wherein the physical reconfiguration comprises moving a member from a subset of the array to another subset of the array.

21. The method of claim 17, wherein the capacity upgrade goal and the performance upgrade goal are calculated to achieve an overall efficiency of a system comprising the array.

22. The method of claim 21, wherein the overall efficiency is at least partially predicted by the overall capacity according to a first function, and by the overall performance according to a second function.

23. The method of claim 22, wherein the step of generating further comprises emphasizing the first physical reconfiguration recommendation if the overall efficiency predicted by the first function is higher, and emphasizing the second physical reconfiguration recommendation if the overall efficiency predicted by the second function is higher.

24. The method of claim 23, wherein the overall efficiency comprises a system throughput rate, the first function is based at least in part on a storage subsystem paging rate, and the second function is based at least in part on a cache subsystem miss penalty.

25. The method of claim 18, wherein the performance classes are based solely upon clock frequency in hertz.

\* \* \* \* \*